Sept. 5, 1961 J. H. KUCK 2,998,942

AUTOCORRELATION DISCRIMINATOR

Filed Jan. 27, 1953 2 Sheets-Sheet 1

INVENTOR.
JOHN H. KUCK
BY G. D. O'Brien
O. Boxter Warner
ATTORNEYS

AUTOCORRELATION DISCRIMINATOR

Filed Jan. 27, 1953 2 Sheets-Sheet 2

INVENTOR
JOHN H. KUCK

BY G. D. O'Brien
Q. Baxter Warner
ATTORNEYS

2,998,942
AUTOCORRELATION DISCRIMINATOR

John H. Kuck, Silver Spring, Md., assignor to the United States of America as represented by the Secretary of the Navy Filed Jan. 27, 1953, Ser. No. 333,555
9 Claims. (Cl. 244—14)

This invention relates generally to homing systems for aerial missiles, and more particularly to an improved homing system utilizing an autocorrelation discriminator.

It is one of the objects of this invention to provide an improved homing system utilizing an autocorrelation type of discriminator, and one which will offer substantial advantages in stability by (1) elimination of a critical alignment problem (i.e., between a reference oscillator and the discriminator in a conventional system), and (2) substitution of a single stable mechanical adjustment for the adjustment of various electrical components which must now be held to close tolerances in order to maintain alignment between the discriminator center frequency and the phase shifter frequency.

Another object of the invention is to provide an improved homing system having an autocorrelation discriminator in which the required time delay of the signal (to be explained subsequently) is obtained mechanically by the use of a recording and reproducing device utilizing a moving electrostatic memory track on which the signal is recorded at one point and removed at a point along the track far enough from the recording point.

Other objects and many of the attendant advantages of this invention will be readily appreciated as the same becomes better understood by reference to the following detailed description when considered in connection with the accompanying drawings wherein.

Figure 3:
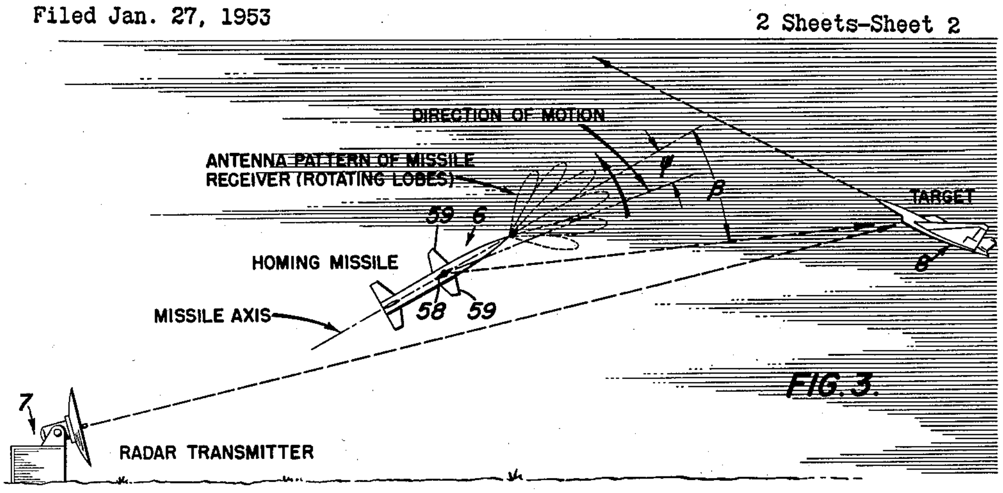
Figure 4:
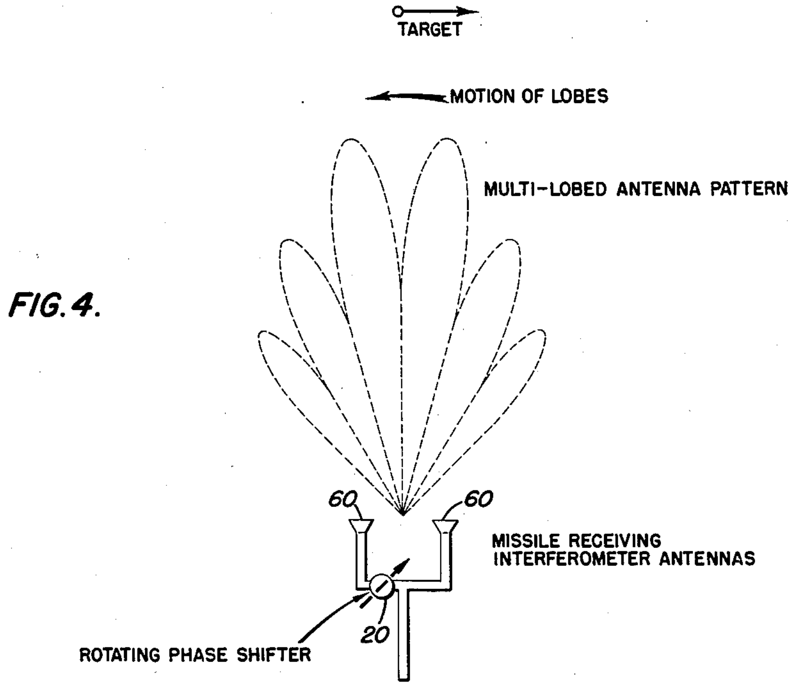

FIG. 3 is a schematic of a homing missile system, employing the features of the invention, and showing the receiving antenna pattern in the vertical plane for a pair of receiving horns mounted on the missile in the vertical plane to control motions of the missile in this plane; and FIG. 4 is a schematic of the missile receiving interferometer antennas, illustrating the multi-lobed antenna pattern therefor.

In accordance with the invention, an improved homing system is provided for compensating for the yaw movement of an aerial missile by integrating a D.C. signal output from a rate gyroscope, and applying the resultant voltage to a servo loop including a servo amplifier, a motor, and a position feedback potentiometer. The motor then drives a phase shifter through a differential gear so that the phase shifter is turned through the number of electrical degrees corresponding to the electrical degrees of the missile yaw.

One of the important features of the homing system resides in the use of an autocorrelation discriminator in which the required time delay of the signal is obtained mechanically by means of a recording and reproducing device which utilizes a special form of moving electrostatic memory track, namely a memory commutator having each segment thereof connected to ground through a capacitor. The signal is recorded at one point on the commutator and is removed at a second point therefrom to produce the required time delay in the signal.

A memory commutator is utilized in preference to a magnetic memory track for reasons of simplicity, since the signal voltage need not be appreciably attenuated in passing through the commutator, if it is properly designed.

Thus the cumbersome recording and reproducing amplifiers required for a magnetic tape memory track are avoided.

Figures 1, 2:
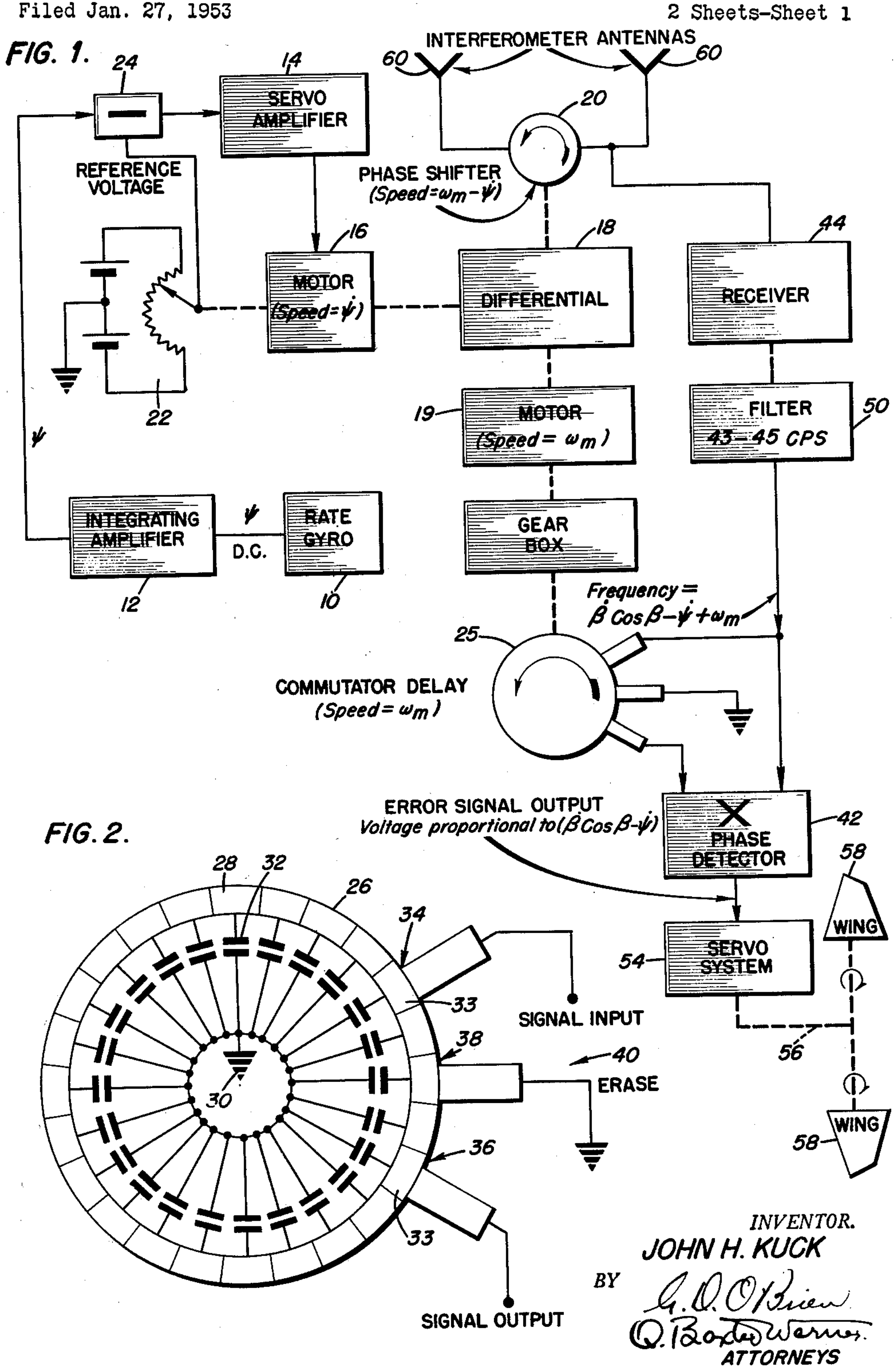
FIG. 1 is a schematic of the improved homing system for an aerial missile, embodying features of the invention.
FIG. 2 is a schematic of a memory commutator shown in FIG. 1, in greater detail, showing each segment thereof capacitively coupled to the ground.

Referring now to FIGS. 1, 3 and 4, there is illustrated the improved homing system utilizing the autocorrelation discriminator. This system can be utilized to compensate for the yaw movements of a homing aerial missile 6 by positioning the appropriate pair of wings 58 on the missile. It is obvious that a motion in a plane perpendicular to the plane of the drawing in FIG. 3 will require a duplicate system comprising a second pair of antennas and duplicate circuitry as shown in FIG. 1 for controlling the other pair of wings 59.

A rate gyroscope 10 mounted on the aerial missile 6 provides a D.C. output signal $\dot{\psi}$ which is fed to an integrating amplifier 12 to be integrated. The output signal $\psi$ from amplifier 12 will represent the actual yaw angle $\psi$ the aerial missile 6 has turned through the resulting signal $\psi$ from the amplifier 12 is then applied by means of servo amplifier 14, motor 16, and a differential gear 18 to turn a phase shifter 20, which is connected to the interferometer antennas 60 by means of wave guides (see FIG. 4), through a number of electrical degrees corresponding to the electrical degrees of yaw movement of the aerial missile 6.

A follow-up potentiometer 22 is also provided in the circuit. This potentiometer 22 is driven off-center by a signal from motor 16. A voltage is picked-off of potentiometer 22 to cancel out the voltage in subtractor 24 from the integrating amplifier 12 corresponding to signal $\psi$. In other words, subtractor 24 compares the angle $\psi$ with the angle that motor 16 has moved through, and the servo amplifier 14 will tend to drive motor 16 to zero. If the motor 16 moves through angle $\psi$, then its speed is $\dot{\psi}$. The differential gear 18 subtracts the speed of motor 16, namely $\dot{\psi}$ from the speed of a motor 19, $\omega_m$, to make the speed of the phase shifter 20 equal to $\omega_m-\dot{\psi}$.

The antenna horns 60 receive a signal transmitted by a radar transmitter 7 and reflected from an object, such as an aircraft target 8, as shown in FIGS. 3 and 4. The signals received by the antenna horns 60 are added to give an output voltage to the receiver 44. The combined antenna pattern, as shown in FIGS. 3 and 4, as determined by the voltage output to the receiver 44, is a multi-lobed pattern due to the interference between the signals received by the antenna horns 60. Rotation of the phase shifter 20 causes the lobes in the pattern to move, for example, counterclockwise. Due to this motion, the signal from the target 8 at a fixed bearing angle relative to the axis of the missile 6 will be modulated at a frequency, $\omega_p$. This is the center frequency to which the null of the discriminator, to be described subsequently, is tuned so that a stationary bearing angle gives zero control signal to the wing servo system 54.

If the missile 6 is not yawing so that the $\dot{\psi}$ signal from the rate gyro 10 is zero, then $\omega_p$, the rate of rotation of the phase shifter 20 will equal $\omega_m$, the speed of motor 19. However, if the missile 6 is yawing, then $\omega_p$ is equal to $\omega_m-\dot{\psi}$.

A target moving to the right in FIG. 4 will then give a modulation frequency $\omega_p+\omega_t$, which is higher than $\omega_p$ due to faster movement through the lobes and will give a discriminator output of one polarity. Motion of the target 8 to the left will give a lower frequency than $\omega_p$, which will result in a discriminator output of opposite polarity. Thus, if the discriminator output is connected to the wing servo system 54, with the proper sense, the wings 58 will be moved in the proper direction to counteract any change in bearing angle.

The important part of the system, therefore, resides in the autocorrelation discriminator. The autocorrelation discriminator is intended for use in a "constant bearing, interferometer type" homing system. The constant bearing type system tends to maintain the missile 6 on a trajectory such that the bearing angle of the line from the missile 6 to the target 8 is maintained at a constant angle relative to a system of coordinates fixed in space. This is accomplished in the homing system by measurement of the rate of change of the angle $\beta$ between the missile axis and the line of sight to the target 8 by means of the interferometer homing antennas 60, subtracting $\dot{\psi}$ the rate of change of the yaw angle $\psi$ between the missile axis and the trajectory (which is measured by the rate gyro 10) and using the resultant error signal $\dot{\beta}-\dot{\psi}$ to move the wings 58 and turn the missile 6 in the proper direction to drive $\dot{\beta}-\dot{\psi}$ to zero.

This autocorrelation discriminator comprises a recording and reproducing device 25 to produce a required time delay of the signal and a phase detector 42. Since the phase detector 42 has two input signals which are identical except for a fixed time delay in one of the signals, there will be a phase delay between the two input signals which will be proportional to the frequency of the signals and will cause the phase detector 42 to deliver an output voltage which is a function of the frequency of the two input signals. The required time delay of the signal is obtained mechanically by the use of the recording and reproducing device 25 which utilizes a moving electrostatic memory track on which the signal (shown in FIG. 1 as 43 to 45 c.p.s.) from the receiver 44 after passing through a bandpass filter 50 is recorded at one point and is removed at a point along the track far enough from the recording point to produce the required time delay. The memory track referred to is shown in FIG. 1, and in greater detail in FIG. 2. It comprises a commutator 26 having each segment thereof, such as 28, capacitively coupled to ground 30 by means of a capacitor, such as 32.

The signal voltage to be delayed is recorded at one point on a segment, for example, 33 of the rotating commutator 26, say point 34, and is removed from segment 33 at a second point, say 36, after the commutator has rotated through the desired angle to produce the required time delay in the signal. When segment 33 arrives at point 38, the stored charge is erased through the ground discharge arrangement 40. The signal output, delayed in time, is then fed to one input of phase detector 42, and the undelayed signal from receiver 44 and filter 50 is fed to the other input of the phase detector 42, the output of which constitutes the error signal output. This error signal output is then properly filtered to pass 43–45 cycles per second alternating circuit components, and is then fed to the control servo system 54 of the aerial missile. The servo system 54, in turn, is mechanically connected to the wings 58 by means of a mechanical connection 56. Thus, the error signal output is utilized to control the servo system 54, and the latter, in turn, operates the wings 58 of the missile to make the proper correction for yaw movement.

As previously mentioned, the phase detector 42 receives two input signals, which are identical, except that one signal is given a fixed time delay by the recording and reproducing delay device 25. Since the time delay is fixed, the phase delay of the delayed signal will be proportional to the frequency of the signal. Since the phase detector 42 delivers an output signal which is a function of the phase difference between the two input signals, its output signal must be a function of the frequency of the two signals. This function of frequency is such that the error signal output of the autocorrelator has nulls at each frequency, *f*, at which $$n\left(\frac{1}{2f}\right)+\frac{1}{4f}=t_d$$

$$f=\frac{1}{t_d}\left(\frac{n}{2}+\frac{1}{4}\right) \qquad (1)$$

where $n$ is any integer and $t_d$ is the ime delay in the commutator.

In order to obtain greatest sensitivity from the discriminator, $n$ should be chosen so that the spacing between nulls on a frequency scale is about equal to the desired bandwith, i.e.:

$$\frac{1}{t_d}\left(\frac{n}{2}+\frac{1}{4}\right)-\frac{1}{t_d}\left(\frac{n-1}{2}+\frac{1}{4}\right)=\Delta f \qquad (2)$$

$$t_d=\frac{1}{\Delta f}\left(\frac{1}{2}\right)$$

Thus for one cycle bandwidth and a center frequency of 44 c.p.s., there is obtained from Equation 2:

$$t_d=0.5 \text{ sec.}$$

and from Equation 1:

$$44=\frac{1}{0.5}\left(\frac{n}{2}+\frac{1}{4}\right)=n+\frac{1}{2}$$

$n=44$ (picking nearest integer)
and readjusting $t_d$ by use of Equation 1:

$$t_d=\frac{1}{44}\left(\frac{44}{2}+\frac{1}{4}\right)=0.5057 \text{ sec.}$$

The value of $n$ and the number of segments, per cycle for commutator 26 which is needed to delineate the sinusoidal signal voltage will set the number of commutator segments, such as 28 needed in the distance, S, as shown in FIG. 2, around the circumference between input and output brushes. If ten segments per cycle are assumed and $n=44$, then 440 segments are needed. These segments might be narrow strips of silver paint applied over a thin film of high dielectric constant insulator on the circumference of a grounded metal cylinder, thus giving the required capacities to ground in a simple construction. Segments 0.02 inch wide would require a commutator 26 having a diameter of about three inches. It is probable that the number of commutator segments, such as 28, could be reduced by a decrease in the value of $n$, since the loss in discriminator sensitivity might be compensated for by amplification of the signal, if necessary.

If the method suggested for making the commutator 26 does not give sufficient capacity per segment, larger capacitors 32 can be added inside of the cylinder. The capacities and leakage resistances should be large enough so that the time constant of each segment 28 is greater than 0.5 sec. in order to prevent loss of charge in transit. Use of a cathode follower having as high input impedance and low input capacities as is practical on the pickoff brush will minimize the size of the capacitors 32 in the commutator 26. Variations of motor speed do not affect the alignment between phase shifter frequency and the discriminator null frequency in this system. Since the same motor 16 is used to drive the phase shifter 20 and the delay track device 25 such variations cancel out, viz: phase shifter frequency $f_p=\omega_m$ $$t_d=\frac{S}{K\omega_m}$$

S is the spacing between writing and reading brushes expressed as a fraction of the total circumference of the commutator 26.

Discriminator frequency $$f=\frac{K\omega_m}{S}\left(\frac{n}{2}+\frac{1}{4}\right)$$

and since $$\frac{f}{f_p}=\frac{K}{S}\left(\frac{n}{2}+\frac{1}{4}\right)$$

the discriminator frequency is independent of motor speed. The proper adjustment of the discriminator null will be obtained merely by designing for the proper relationship between the gear ratio, which affects K, and the brush spacing S, so that the ratio $f/f_p$ will be unity. Since final alignment would require only a mechanical adjustment of brush spacing, it is possible to make this alignment stable and reproducible.

However, it must be noted that there is an alignment problem between motor speed and the frequency of the 43–45 c.p.s. bandpass filter, as shown in FIG. 1, which is for the purpose of limiting the bandwidth of the discriminator to obtain target discrimination. However, this alignment should not be as critical as alignment of the null and it might be possible to maintain a sufficiently constant motor speed. If necessary motor speed could be controlled by driving it with a tuning fork oscillator and a similar tuning fork could be used as an electromechanical filter. Use of the two forks in this manner should provide cancellation of any effect of temperature on the tuning fork frequency.

A further improvement provided by this system is the elimination in the conventional interferometer homing device of the frequency modulated reference oscillator and the difficult problem of maintaining the extremely precise alignment, which is required between this oscillator and the discriminator in the present system.

In operation, the two interferometer antennas 60 and the phase shifter 20 receive a signal transmitted by radar transmitter 7 and reflected from aerial target 8, such as an airplane. The receiver 44 then amplifies this received signal and detects the modulation frequency which results from the combination of the rotation of the phase shifter 20, the rotation of the line of sight between the missile 6 and the target 8, and the yaw movement of the aerial missile 6. The proper signal voltages are then filtered out by the filtering means 50.

The autocorrelation discriminator then produces a detected direct current error signal which is proportional to the modulation frequency from a fixed reference value which the modulation frequency has when the missile 6 is on its collision course. This is accomplished by means of the electrostatic signal recording and removing device 25 and the phase detector 42.

The signals from the recording and removing device 25 and from the filter 50 are then fed to the phase detector 42, the output of which represents the error signal. This signal is then fed to the servo system 54 and is utilized to control the missile wings 58 through the mechanical connection 56 in order to correct for yaw movements of the missile.

Obviously many modifications and variations of the present invention are possible in the light of the above teachings. It is therefore to be understood that within the scope of the appended claims the invention may be practiced otherwise than as specifically described.

What is claimed is:

1. In a homing system for an aerial missile having a two antenna interferometer arrangement including a rotating phase shifter and a receiver including detector circuits so that when signals of the same frequency reflected from an aerial target are received by said antennas, the rotation of said phase shifter causes a difference between the signals from said antennas to produce a modulation frequency in said detector circuits, said modulation frequency being the same frequency which is obtained if the signal at the input of said receiver is obtained from a multi-lobed antenna pattern having lobes rotating at a rate determined by the speed of rotation of said phase shifter; in combination with means including a first motor for rotating said phase shifter so that its rotation is a constant value when said missile and target are stationary and which will change the speed of rotation of said phase shifter when said missile yaws in such a way that the rate of rotation of said antenna pattern lobes in space is not changed due to yawing of said missile, means for filtering the modulation frequency signal output from said receiver, a second motor, an autocorrelation discriminator for producing a time delay in a direct current error signal proportional to the deviation of said modulation frequency signal from a fixed reference value which said modulation frequency signal has when said missile is on said collision course, said discriminator including an electrostatic signal recording and removing device driven by said second motor, and a phase detector for combining the signals to produce an error signal output which can be utilized to operate a servo-operated wing system to correct for yawing movements of said missile.

2. In a homing system for an aerial missile having a two antenna interferometer arrangement including a rotating phase shifter and a receiver including detector circuits so that when signals of the same frequency reflected from an aerial target are received by said antennas, the rotation of said phase shifter causes a difference between the signals from said antennas to produce a modulation frequency in said detector circuits, said modulation frequency being the same frequency which is obtained if the signal at the input of said receiver is obtained from a multi-lobed antenna pattern having lobes rotating at a rate determined by the speed of rotation of said phase shifter; in combination with means including a first motor for rotating said phase shifter so that its rotation is a constant value when said missile and target are stationary and which will change the speed of rotation of said phase shifter when said missile yaws in such a way that the rate of rotation of said antenna pattern lobes in space is not changed due to yawing of said missile, said means also including a device for subtracting the frequency attributable solely to the yaw movement of said missile from said modulation frequency of the signal received by said antenna arrangement, means for filtering the modulation frequency signal output from said receiver, a second motor, an autocorrelation discriminator for producing a time delay in a direct current error signal proportional to the deviation of said modulation frequency signal from a fixed reference value which said modulation frequency signal has when said missile is on said collision course, said discriminator including an electrostatic signal recording and removing device driven by said second motor, and a phase detector for combining the signals to produce an error signal output which can be utilized to operate a servo-operated wing system to correct for yawing movements of said missile.

3. In a homing system for an aerial missile having a two antenna interferometer arrangement including a rotating phase shifter and a receiver including detector circuits so that when signals of the same frequency reflected from an aerial target are received by said antennas, the rotation of said phase shifter causes a difference between the signals from said antenna to produce a modulation frequency in said detector circuits, said modulation frequency being the same frequency which is obtained if the signal at the input of said receiver is obtained from a multilobed antenna pattern having lobes rotating at a rate determined by the speed of rotation of said phase shifter; in combination with means including a first motor for rotating said phase shifter so that its rotation is a constant value when said missile and target are stationary and which will change the speed of rotation of said phase shifter when said missile yaws in such a way that the rate of rotation of said antenna pattern lobes in space is not changed due to yawing of said missile, said means also including a device for subtracting the frequency attributable solely to the yaw movement of said missile from said modulation frequency received by said antenna arrangement, means for filtering the modulation frequency signal output from said receiver, a second motor, an autocorrelation discriminator for producing a time delay in a direct current error signal proportional to the deviation of said modulation frequency signal from a fixed reference value which said modulation frequency signal has when said missile is on said collision course, said discriminator including an electrostatic signal recording and removing device having a moving memory track on which the modulation signal thereto is recorded at one point and is removed at a point further along said track from said recording point to produce said delayed modulation signal, said device being operated by said second motor, and a phase detector for combining the signals to produce an error signal output which can be utilized to operate a servo-operated wing system to correct for yawing movements of said missile.

4. In a homing system for an aerial missile having a two antenna interferometer arrangement including a rotating phase shifter and a receiver including detector circuits so that when signals of the same frequency reflected from an aerial target are received by said antennas, the rotation of said phase shifter causes a difference between the signals from said antennas to produce a modulation frequency in said detector circuits, said modulation frequency being the same frequency which is obtained if the signal at the input of said receiver is obtained from a multilobed antenna pattern having lobes rotating at a rate determined by the speed of rotation of said phase shifter; in combination with means including a first motor for rotating said phase shifter so that its rotation is a constant value when said missile and target are stationary and which will change the speed of rotation of said phase shifter when said missile yaws in such a way that the rate of rotation of said antenna pattern lobes in space is not changed due to yawing of said missile, said means also including a device for substracting the frequency attributable solely to the yaw movement of said missile from said modulation frequency received by said antenna arrangement, means for filtering the modulation frequency signal output from said receiver, a second motor, an autocorrelation discriminator for producing a time delay in a direct current error signal proportional to the deviation of said modulation frequency signal from a fixed reference value which said modulation frequency signal has when said missile is on said collision course, said discriminator including an electrostatic signal recording and removing device having a moving memory track on which the signal thereto is recorded at one point and is removed at a point further along said track from said recording point to produce a delayed modulation signal, said device being operated by said second motor, said track being divided into a plurality of segments with each segment being connected to ground through capacitor, and a phase detector for combining the signals to produce an error signal output which can be utilized to operate a servo-operated wing system to correct for yawing movements of said missile.

5. In combination, a frequency discriminator consisting of a commutator memory device having a plurality of segments, each segment being connected to ground through a capacitor, input and output brushes bearing on the surface of said commutator for successively contacting each of said segments, and means separating said input and output brushes for erasing the charge stored on each of said capacitors; a motor, said commutator memory device being operatively connected to said motor, and a phase detector, the output voltage of said phase detector being a function of an input frequency which is proportional in magnitude to the deviation of the frequency from a center frequency and in polarity to the sense of variation, said discriminator having a center frequency proportional to the speed of said motor driving said commutator.

6. An autocorrelation discriminator for producing a detected direct current error signal proportional to the deviation of a modulation frequency signal from a fixed reference value, said discriminator including an electrostatic signal recording and removing device for receiving the modulation frequency signal, said device having a moving memory track divided into a number of segments, with each segment being connected to ground through a capacitor, input and output brushes bearing on the surface of the memory track for sucessively contacting each of said segments, means for erasing the charge stored on each of said capacitors after said segments have rotated past said output brush; and a phase detector, the output of said device being a delayed modulation frequency signal, the phase between said delayed modulation frequency signal and the undelayed modulation frequency signal being detected by said detector to give a detected direct current error voltage output signal which is proportional to the deviation of the undelayed modulation frequency signal from a fixed reference value.

7. An autocorrelation discriminator for producing a direct current error signal proportional to the deviation of a modulation frequency from a fixed reference value, said discriminator including an electrostatic signal recording and removing device and a phase detector, said device including a moving memory track on which a modulation frequency signal is recorded at one point thereon and is removed at a point further along said track from the recording point to produce a delayed modulation frequency signal, said memory track being divided into a number of segments, with each segment being connected to ground through a capacitor, input and output brushes bearing on the surface of the memory track for successively contacting each of said segments, means for erasing the charge stored on each of said capacitors after said segments have rotated past said output brush, the phase between said delayed modulation frequency signal and the undelayed modulation frequency signal being detected by said detector to give a detected direct current error voltage output signal which is proportional to the deviation of the undelayed modulation frequency signal from a fixed reference value.

8. An autocorrelation discriminator for producing a detected direct current error signal proportional to the deviation of a modulation frequency signal from a fixed reference value, said discriminator including an electrostatic signal recording and removing device for receiving said modulation frequency signal, said device having a moving memory track divided into a number of segments, with each segment being connected to ground through a capacitor, input and output brushes bearing on the surface of the memory track for successively contacting each of said segments; and a phase detector, the output of said device being a delayed modulation frequency signal, the phase between said delayed modulation frequency signal and the undelayed modulation frequency signal being detected by said detector to give a detected direct current error voltage output signal which is proportional to the deviation of the undelayed modulation frequency signal from a fixed reference value.

9. An autocorrelation discriminator for producing a direct current error signal proportional to the deviation of a modulation frequency from a fixed reference value, said discriminator including an electrostatic signal recording and removing device and a phase detector, said device including a moving memory track on which a modulation frequency signal is recorded at one point thereon and is removed at a point further along said track from the recording point to produce a delayed modulation frequency signal, said memory track being divided into a number of segments, with each segment being connected to ground through a capacitor, input and output brushes bearing on the surface of the memory track for successively contacting each of said segments, the phase between said delayed modulation frequency signal and the undelayed modulation frequency signal being detected by said detector to give a detected direct current error voltage output signal which is proportional to the deviation of the undelayed modulation frequency signal from a fixed reference value.

References Cited in the file of this patent

UNITED STATES PATENTS

| | | |
|---|---|---|
| 1,851,092 | Fetter | Mar. 29, 1932 |
| 2,476,301 | Jenks | July 19, 1949 |

(Other references on following page)

UNITED STATES PATENTS 2,489,263 Busignies -------------- Nov. 29, 1949
2,502,721 Halpert ---------------- Apr. 4, 1950
2,514,054 Hallden --------------- July 4, 1950
2,541,627 Williams -------------- Feb. 13, 1951
2,602,161 Proskauer -------------- July 1, 1952
2,616,640 Bedford et al. ---------- Nov. 4, 1952
2,629,827 Eckert et al. ----------- Feb. 24, 1953
2,652,489 Robinson ------------- Sept. 15, 1953
2,701,875 Baltzer ----------------- Feb. 8, 1955